US009165586B2

(12) United States Patent
Kawakami et al.

(10) Patent No.: US 9,165,586 B2
(45) Date of Patent: Oct. 20, 2015

(54) MAGNETIC RECORDING MEDIUM

(75) Inventors: Shinji Kawakami, Ibaraki (JP); Sadamu Kuse, Ibaraki (JP); Kenji Tanaka, Ibaraki (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 307 days.

(21) Appl. No.: 13/330,219

(22) Filed: Dec. 19, 2011

(65) Prior Publication Data
US 2012/0156524 A1   Jun. 21, 2012

(30) Foreign Application Priority Data

Dec. 20, 2010   (JP) ................................ 2010-283276

(51) Int. Cl.
*G11B 5/706* (2006.01)
*G11B 5/70* (2006.01)
*G11B 5/714* (2006.01)

(52) U.S. Cl.
CPC .. *G11B 5/70* (2013.01); *G11B 5/714* (2013.01)

(58) Field of Classification Search
None
See application file for complete search history.

(56) References Cited

U.S. PATENT DOCUMENTS

| 2004/0241498 A1* | 12/2004 | Zinbo | 428/694 BN |
| 2005/0282040 A1* | 12/2005 | Oyanagi et al. | 428/840 |
| 2006/0141294 A1* | 6/2006 | Nishida et al. | 428/845.5 |
| 2007/0236835 A1 | 10/2007 | Oyanagi et al. | |
| 2008/0107921 A1* | 5/2008 | Kuse et al. | 428/811 |
| 2011/0242698 A1* | 10/2011 | Lowery et al. | 360/75 |

FOREIGN PATENT DOCUMENTS

| JP | 5-307737 A | 11/1993 |
| JP | 2001-256633 A | 9/2001 |
| JP | 2007-294083 A | 11/2007 |
| JP | 2010-218653 A | 9/2010 |

OTHER PUBLICATIONS

Japanese Office Action, dated Jan. 10, 2012, for Japanese Application No. 2010-283276.

* cited by examiner

*Primary Examiner* — Holly Rickman
*Assistant Examiner* — Linda Chau
(74) *Attorney, Agent, or Firm* — Birch, Stewart, Kolasch & Birch, LLP.

(57) ABSTRACT

The magnetic recording medium of the present invention comprises: a non-magnetic substrate; a non-magnetic layer formed on one of principal surfaces of the non-magnetic substrate; and a magnetic layer formed on a principal surface of the non-magnetic layer opposite to the non-magnetic substrate. Mr and t satisfy $0.0020\ \mu T\cdot m \le Mr\cdot t \le 0.0150\ \mu T\cdot m$, where Mr is the residual magnetic flux density of the magnetic layer, and t is the average thickness of the magnetic layer, L1 satisfies $2\ nm \le L1 \le 6\ nm$, where L1 is the average thickness of a first mixed layer that is formed on the surface of the magnetic layer opposite to the non-magnetic layer, and L2 satisfies $0.1 \le L2/t \le 0.45$, where L2 is the average thickness of a second mixed layer that is formed on the surface of the magnetic layer facing the non-magnetic layer.

9 Claims, 2 Drawing Sheets

MAGNETIC RECORDING MEDIUM

BACKGROUND OF INVENTION

1. Field of the Invention

The present invention relates to large-capacity magnetic recording media, and in particular to a magnetic recording medium having superior magnetic recording properties and transport characteristics.

2. Description of Related Art

Magnetic tape, which is one type of magnetic recording media, has a variety of applications such as audiotape, videotape and computer tape. Especially, in the field of computer data backup tape, tapes having a recording capacity of several hundred gigabytes per reel have been commercially available as the capacity of hard disks to be backed up has increased. In the future, it will be essential to increase the capacity of such data backup tape in order to support further increases in the capacity of hard disks.

With regard to a magnetic tape for use as the data backup tape mentioned above, the recording wavelength has been shortened with the further increase in the recording capacity, and in order to reduce thickness loss during recording/reproduction, an effort has been made to reduce the thickness of the magnetic layer of the tape. To achieve the reduction in the thickness of the magnetic layer, a magnetic recording medium having a multilayered structure has been adopted. In the multilayered magnetic recording medium, a non-magnetic layer is provided on a non-magnetic substrate and a magnetic layer is further provided on the non-magnetic layer.

For such a multilayered magnetic recording medium, studies have been conducted to reduce noise by reducing variations in the interface between the magnetic layer and the non-magnetic layer (see JP 2001-256633 A, for example). Further, there has been proposed a magnetic recording medium in which the average thickness of the magnetic layer and $\sigma_d$ as the standard deviation of the magnetic substance distribution in the thickness direction of the magnetic layer, in particular in the interface between the magnetic layer and the non-magnetic layer are specified (see JP 2007-294083 A, for example).

JP 2001-256633 A discloses a multilayered magnetic recording medium in which d as the average thickness of the magnetic layer is 0.01 to 0.3 μm, and the ratio of σ as the standard deviation of the thickness of the magnetic layer to d as the average thickness of the magnetic layer (σ/d) is ≤0.5.

Further, JP 2007-294083 A discloses a magnetic recording medium in which δ as the average thickness of the magnetic layer is 10 to 100 nm, and $\sigma_d$ as the standard deviation is 5 to 50 nm in terms of coating layer in the magnetic recording medium, where $\sigma_d$ is obtained by measuring by TOF-SIMS a depth profile of an element present only in the magnetic layer among elements constituting the ferromagnetic powder and subjecting a differential curve of the depth profile to a normal distribution curve fitting.

In JP 2001-256633 A, a picture of the cross section of the magnetic layer is taken under a transmission electron microscope (TEM), the surface of the magnetic layer and the interface between the magnetic layer and the non-magnetic layer are each traced to determine the thickness of the magnetic layer at each point, and the standard deviation is determined relative to the variations in the thickness. On the other hand, in JP 2007-294083 A, attention is focused upon the element present only in the magnetic layer. The depth profile of the element in the interface between the magnetic layer and the non-magnetic layer is measured, and the standard deviation relative to the variations in the interface is determined from the depth profile curve. For a standardization purpose, when $\sigma_d$ as the standard deviation of the variations in the interface is divided by δ as the average thickness of the magnetic layer in JP 2007-294083 A, $\sigma_d/\delta$ is ≤0.5. This indicates that JP 2007-294083 A has the same technical principles as those of JP 2001-256633 A.

By such techniques, improved magnetic conversion characteristics can be expected. However, such techniques may be not sufficient for obtaining a magnetic recording medium having not only improved magnetic conversion characteristics but also superior transport characteristics and durability.

With the foregoing in mind, it is an object of the present invention to provide a magnetic recording medium having not only superior magnetic conversion characteristics but also superior transport characteristics.

SUMMARY OF THE INVENTION

The magnetic recording medium of the present invention is a magnetic recording medium including: a non-magnetic substrate; a non-magnetic layer formed on one of principal surfaces of the non-magnetic substrate; and a magnetic layer formed on a principal surface of the non-magnetic layer opposite to the non-magnetic substrate. Mr and t satisfy 0.0020 μT·m≤Mr·t≤0.0150 μT·m, where Mr is the residual magnetic flux density of the magnetic layer, and t is the average thickness of the magnetic layer, L1 satisfies 2 nm≤L1≤6 nm, where L1 is the average thickness of a first mixed layer that is formed on the surface of the magnetic layer opposite to the non-magnetic layer, and L2 satisfies 0.1≤L2/t≤0.45, where L2 is the average thickness of a second mixed layer that is formed on the surface of the magnetic layer facing the non-magnetic layer.

According to the present invention, the magnetization of the magnetic layer is controlled at an adequate level. Therefore, it is possible to provide a magnetic recording medium having superior magnetic recording properties as well as transport characteristics and with no output waveform distortion even when read by a high-sensitive GMR head.

DETAILED DESCRIPTION OF THE INVENTION

The magnetic recording medium of the present invention is a magnetic recording medium including: a non-magnetic substrate; a non-magnetic layer formed on one of principal surfaces of the non-magnetic substrate; and a magnetic layer formed on a principal surface of the non-magnetic layer opposite to the non-magnetic substrate. Mr and t satisfy 0.0020 μT·m≤Mr·t≤0.0150 μT·m, where Mr is the residual magnetic flux density of the magnetic layer, and t is the average thickness of the magnetic layer, L1 satisfies 2 nm≤L1≤6 nm, where L1 is the average thickness of a first mixed layer that is formed on the surface of the magnetic layer opposite to the non-magnetic layer, and L2 satisfies 0.1≤L2/t≤0.45, where L2 is the average thickness of a second mixed layer that is formed on the surface of the magnetic layer facing the non-magnetic layer.

Since Mr and t are set to satisfy $0.0020\ \mu T \cdot m \le Mr \cdot t \le 0.0150\ \mu T \cdot m$, the magnetic recording medium of the present invention has a large recording density. Furthermore, the first mixed layer and the second mixed layer are set such that L1 and L2 satisfy $2\ nm \le L1 \le 6\ nm$ and $0.1 \le L2/t \le 0.45$, respectively. Thus, the magnetic recording medium of the present invention has superior magnetic conversion characteristics and transport characteristics.

Previous to this invention, the present inventors proposed in JP 2008-128672 A method by which the thickness of layers of different element compositions included in a structure can be measured without being affected by human decisions and without inaccuracies such as variations in value depending on the conditions. In the present invention, t as the average thickness of the magnetic layer is defined as being determined in the following manner (hereinafter referred to as the "layer thickness measuring method of the present invention") on the basis of the previously proposed layer thickness measuring method.

In the layer thickness measuring method of the present invention, first, a carbon layer having a thickness of about 50 to 100 nm is formed by sputtering on the surface of the magnetic layer of the magnetic recording medium to be measured. Then, a Pt—Pd layer having a thickness of about 50 to 100 nm is further formed by sputtering on the carbon layer. Next, for a sample including the carbon layer, the Pt—Pd layer, the magnetic layer and the non-magnetic layer, its cross section is obtained using a focused ion beam (FIB) system. The cross section obtained is then observed under a scanning electron microscope (SEM) equipped with a YAG (Yttrium Aluminum Garnet) detector to obtain a backscattered electron (BSE) image of the cross section at an acceleration voltage of 7 kV. Subsequently, the data of the image is digitalized to obtain data on the luminance of the image in the thickness direction, and a luminance curve is created from the image luminance data.

In the digitalization of the image, the cross-sectional image obtained (e.g., FIG. 1) is divided into a certain number of areas in the X-axis direction (the thickness direction of each layer) as well as in the Y-axis direction (the plane direction of each layer), and the luminance of the divided image at each coordinate point is converted into a certain levels of gray scale. More specifically, when the cross-sectional image is obtained in the form of a picture, the picture is read using a scanner to convert the picture into digital data, and the data is subjected to, for example, 8-bit processing, thus obtaining 256-level (0 to 255) gray scale data on the luminance. In the present case, the image is divided into 2560 areas in the Y-axis direction at the time of obtaining the luminance data. Even when the cross-sectional image is obtained through a photoelectric conversion element such as a CCD, digital data of the cross-sectional image at each coordinate point can be obtained by converting the image into digital data.

Figure 1A:
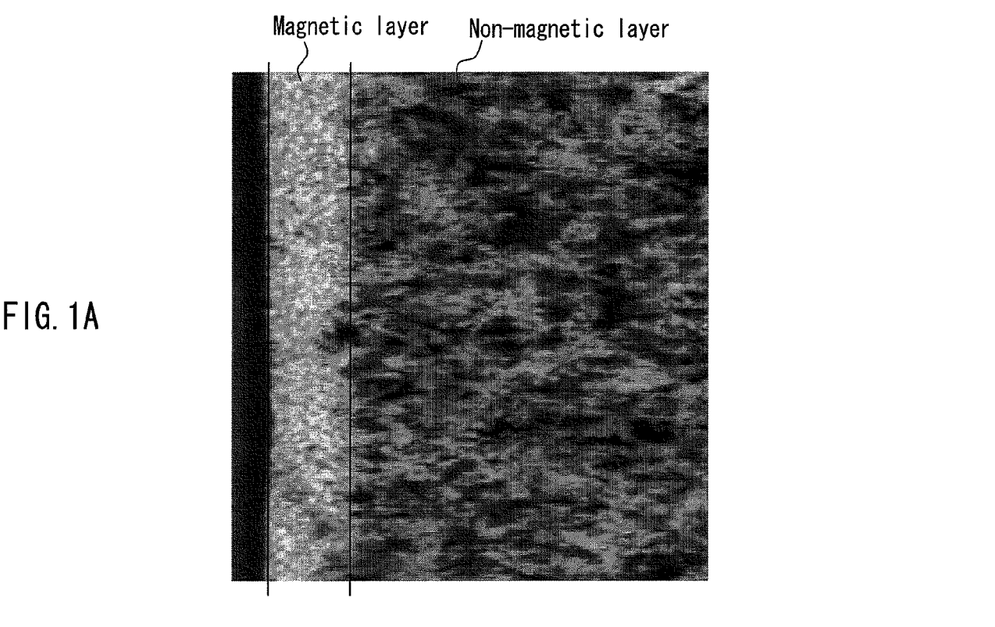
FIG. 1A is a cross-sectional image of a magnetic recording medium.
Figure 1B:
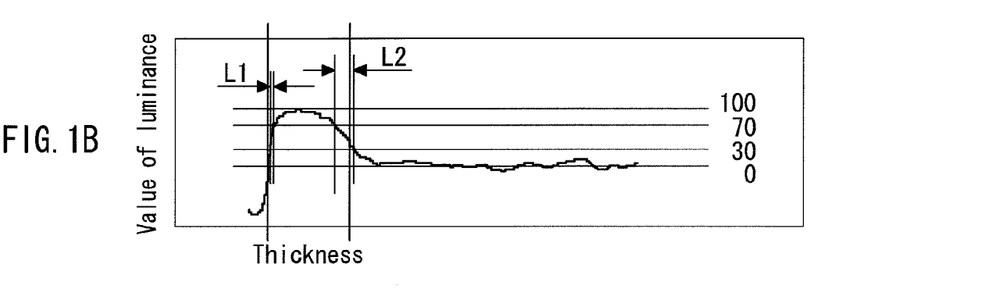
FIG. 1B is a graph showing the luminance (luminance curve) of the cross section of the magnetic recording medium shown in FIG. 1A.

Next, the values of luminance (e.g., 2560 values of luminance) of the obtained two dimensional data at each X coordinate are averaged in the Y coordinate direction, thus obtaining a luminance curve as shown in FIG. 1B, which is averaged in the Y-axis direction as the coating thickness direction.

Figure 1C:
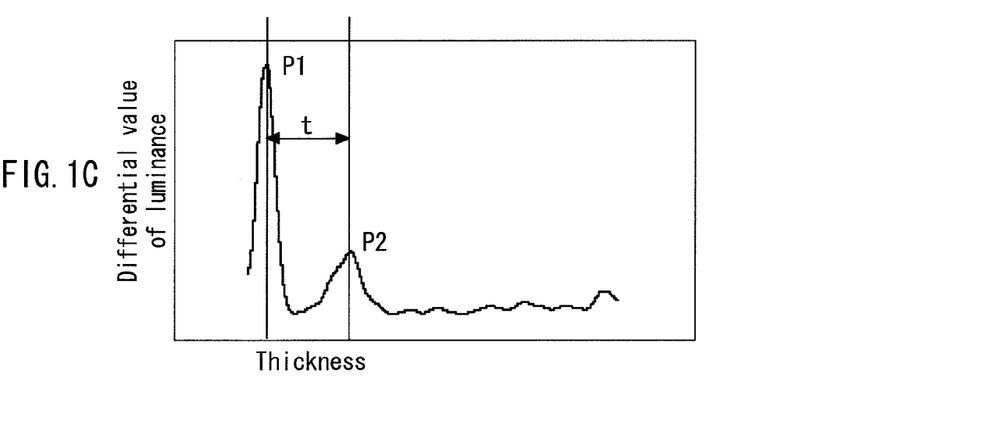
FIG. 1C is a graph showing a differential curve of the luminance curve shown in FIG. 1B.

Finally, the luminance curve is differentiated to create a differential curve. The boundary of each layer is determined from the positions of the peaks of the differential curve, and t as the average thickness of the magnetic layer is determined from the distance between the peaks.

Moreover, as a result of pursuing the study thereafter, the present inventors have found correlations between the shape of the luminance curve and the magnetic recording properties and transport durability of a magnetic recording medium. This will be explained with reference to FIGS. 1A to 1C.

FIG. 1A is a cross-sectional image of a magnetic recording medium as one example of the present invention, which image is taken under a scanning electron microscope (SEM). FIG. 1B is a graph showing the luminance (luminance curve) of the cross section of the magnetic recording medium shown in FIG. 1A, and FIG. 1C is a graph showing a differential curve of the luminance curve shown in FIG. 1B. In the present invention, t as the average thickness of the magnetic layer is defined as the distance between the peaks P1 and P2 of the differential curve shown in FIG. 1C. Further, the first mixed layer and the second mixed layers are defined in the present invention as follows. That is, when an average of luminance of the non-magnetic layer is taken as 0 and the highest luminance of the magnetic layer is taken as 100, the first mixed layer is an area (defined by the average thickness L1) on the side of the magnetic layer opposite to the non-magnetic layer and where the luminance is in a range of 70 to 30, and the second mixed layer is an area (defined by the average thickness L2) on the side of the magnetic layer facing the non-magnetic layer and where the luminance is in a range of from 70 to 30. As a result, L1 as the average thickness of the first mixed layer and L2 as the average thickness of the second mixed layer can be determined clearly.

The area referred to as the magnetic layer defined by the thickness t is of a nearly pure magnetic layer except the portions overlapping with the first mixed layer and the second mixed layer. In contrast, the area of the first mixed layer is considered as an area that is high in, for example, lubricant, resin, filler and void contents as compared with the magnetic layer, and the area of the second mixed layer is considered as an area in which the components of the non-magnetic layer are blended.

The study conducted by the present inventors has revealed that L1 as the average thickness of the first mixed layer has a correlation with an S/N ratio in terms of transport duration and magnetic recording properties, and L2 as the average thickness of the second mixed layer has a correlation with an S/N ratio in terms of magnetic recording properties.

The first mixed layer is a mixed layer formed on the surface of the magnetic layer, and is considered as an area that is high in, for example, lubricant, resin, filler and void contents as compared with the magnetic layer. It is considered that since these components are present in the first mixed layer adequately, the transport durability of the magnetic recording medium becomes favorable without significant deterioration of the magnetic recording properties, which in turn improves the practical characteristics.

L1 as the average thickness of the first mixed layer is set within a range of $2\ nm \le L1 \le 6\ nm$, and more preferably $2\ nm \le L1 \le 4\ nm$. When L1 is less than 2 nm, the transport durability deteriorates as, for example, the lubricant, resin, filler and void contents on the surface of the magnetic layer decline. On the other hand, when L1 is larger than 6 nm, the space between the magnetic layer and the magnetic head widens. This may cause an increase in spacing loss during recording/reproduction, which in turn deteriorates the electromagnetic characteristics.

Although methods of controlling L1 within the aforementioned range are not particularly limited, the following examples may be used preferably.

(1) Adjusting the amount of lubricant added to be 0.5 to 5.0% by mass of the entire magnetic layer; adjusting the BET specific surface area of the magnetic powder in the magnetic layer to be 60 to 110 $m^2/g$; adjusting the BET specific surface area of the non-magnetic powder in the non-magnetic layer to be 30 to 90 m²/g; adopting a line pressure of 196 to 294 kN/m and a temperature of 70 to 120° C. as conditions under which calendering is performed; and coating a lubricant on top of the magnetic layer to increase the amount of the lubricant on the surface of the magnetic layer.

To be more specific, a lubricant added to a paint during a paint preparation process will be separated broadly into two types in the magnetic layer and the non-magnetic layer formed afterward; the lubricant that primarily adheres to the magnetic powder, the filler and the like, and the lubricant that is present in voids in a free state without adhering to the magnetic powder, the filler and the like. Here, when the amount of the lubricant added is increased, the lubricant that seeps into the surface of the magnetic layer increases in amount, which in turn increases L1. On the other hand, when the magnetic powder and the non-magnetic powder have a large BET specific surface area, the lubricant that adheres to the surface of the magnetic powder increases in amount, whereas the amount of the lubricant that is present in a free state and does not adhere to the surface of the magnetic powder declines. As a result, the lubricant that seeps into the surface of the magnetic layer declines in amount, which in turn reduces L1. Further, when high linear pressure and temperature are adopted as calendering conditions, projections on the surface of the magnetic layer as one constituent element of L1 are reduced, which in turn reduces L1. Further, since coating a lubricant on top of the magnetic layer increases the amount of the lubricant on the surface of the magnetic layer, L1 increases.

(2) Controlling the amount of binder resin added and controlling the amount of binder on the surface of the magnetic layer through, for example, kneading the magnetic powder and adjusting the degree of surface treatment to which the magnetic powder is subjected To be more specific, an increase in the amount of a binder resin added leads to an increase in the amount of the binder resin on the surface of the magnetic layer that does not adhere to the surface of the magnetic powder, which in turn increases L1. Further, the amount of the binder resin that adheres to the surface of the magnetic powder can be reduced by subjecting the magnetic powder to a surface treatment. This results in an increase in the amount of the binder resin on the surface of the magnetic layer that does not adhere to the surface of the magnetic powder, which in turn increases L1. However, when the dispersion state of the paint changes due to kneading and the amount of the binder resin that adheres to the surface of the magnetic powder increases, the amount of the binder on the surface of the magnetic layer declines, which in turn reduces L1.

(3) Controlling the amount of filler on and voids in the surface of the magnetic layer by adjusting the amount of the filler added and the timing of adding the filler and subjecting the filler to a surface treatment To be more specific, an increase in the amount of the filler added leads to an increase in the amount of the filler present on the surface of the magnetic layer as the amount of the filler in the magnetic layer increases. Thus, L1 increases. Further, the later the timing of adding the filler in the paint preparation process, the less likely it becomes for the added filler to be dispersed. This leads to an increase in the amount of the filler present on the surface of the magnetic layer, which in turn increases L1. Furthermore, when the filler is subjected to a surface treatment, the amount of the binder resin that adheres to the surface of the magnetic powder declines. As a result, the binder resin that does not adhere to the surface of the magnetic powder and is present on the surface of the magnetic layer increases in amount, which in turn increases L1.

(4) Polishing, subsequent to the formation of the magnetic layer, the surface of the magnetic layer with a blade, lapping tape, polishing wheel, etc. so as to directly control the thickness of the first mixed layer As a result of treating the surface of the magnetic layer with a blade, lapping tape, polishing wheel, etc., subsequent to the formation of the magnetic layer, such components as the lubricant and the filler present on the surface of the magnetic layer are removed. Thus, L1 declines.

In the present invention, a magnetic recording medium in which L1 is controlled to be within the aforementioned range can be produced by using one of the methods described above alone, and preferably by using some of the methods described above in combination.

The second mixed layer is a mixed layer that is formed between the magnetic layer and the non-magnetic layer. Ideally, the second mixed layer does not exist. In reality, however, the second mixed layer having a certain level of thickness is formed due to the following reasons. When employing simultaneous multilayer coating in which the magnetic layer is formed on the non-magnetic layer before the non-magnetic layer is dried, the second mixed layer is formed because the non-magnetic paint and the magnetic paint get mixed with each other at the interface between the magnetic layer and the non-magnetic layer. Further, when employing successive multilayer coating in which the magnetic layer is formed on the non-magnetic layer after the non-magnetic layer is dried, the second mixed layer is formed due to the roughness of the surface of the non-magnetic layer, the entry of the magnetic paint into voids in the non-magnetic layer, and irregularities at the interface caused by melting of the surface of the non-magnetic layer at the time of applying the magnetic paint.

t as the average thickness of the magnetic layer and L2 as the average thickness of the second mixed layer are set to satisfy $0.1 \leq L2/t \leq 0.45$, and preferably $0.1 \leq L2/t \leq 0.40$. The smaller the value of L2, the more preferable it is. Ideally, L2 is most preferably 0. In reality, however, a lower limit to L2/t may be about 0.1 due to technical limitations. Further, when L2/t is larger than 0.45, L2 as the average thickness of the second mixed layer becomes too large relative to t as the average thickness of the magnetic layer. This leads to a reduction in the amount of the magnetic powder effective in recording/reproduction, whereby the S/N ratio tends to decline.

Although methods of controlling L2/t within the aforementioned range are not particularly limited, the following examples may be used preferably.

(1) Bringing the rheology characteristics of the non-magnetic paint and those of the magnetic paint closer to each other as much as possible when forming the non-magnetic layer and the magnetic layer by simultaneous multilayer coating.

If the rheology characteristics of the non-magnetic paint and those of the magnetic paint are brought closer to each other as much as possible when performing simultaneous multilayer coating, the non-magnetic paint and the magnetic paint are less mixed with each other at the interface. As a result, variations in the thickness of the magnetic layer are reduced, which in turn reduces L2.

(2) Using a pump that does not cause pulsation as a pump for supplying each paint to an applicator when forming the non-magnetic layer and the magnetic layer by simultaneous multilayer coating.

When the non-magnetic paint and the magnetic paint are supplied without pulsation, variations in the coating thickness of each paint can be suppressed, which in turn reduces L2.

(3) Preventing a deviation of high-frequency vibrational components from developing in the speed of transporting the non-magnetic substrate when forming the non-magnetic layer and the magnetic layer.

When the deviation of high-frequency vibrational components in the speed of transporting the non-magnetic substrate is reduced, so-called flopping of the non-magnetic substrate does not occur. As a result, variations in the coating thickness can be suppressed, which in turn reduces L2.

(4) When forming the non-magnetic layer and the magnetic layer by successive multilayer coating, after forming and drying the non-magnetic layer, subjecting the non-magnetic layer to calendering so as to make it smooth and curing the non-magnetic layer by heat or radiation to crosslink the non-magnetic layer so as to prevent the surface of the non-magnetic layer from melting when forming the magnetic layer.

The non-magnetic layer and the magnetic layer are less mixed with each other at the interface by these methods. As a result, variations in the thickness of the magnetic layer are reduced, which in turn reduces L2.

(5) Forming a resin layer on the surface of the non-magnetic layer and curing the resin layer by crosslinking thereafter so as to prevent the magnetic paint from seeping into the non-magnetic layer when forming the magnetic layer.

The magnetic layer and the resin layer are less mixed with each other at the interface by this method. As a result, variations in the thickness of the magnetic layer are reduced, which in turn reduces L2.

In the present invention, a magnetic recording medium in which L2/t is controlled to be within the aforementioned range can be produced by using one of the methods described above alone, and preferably by using some of the methods described above in combination.

Figure 2:
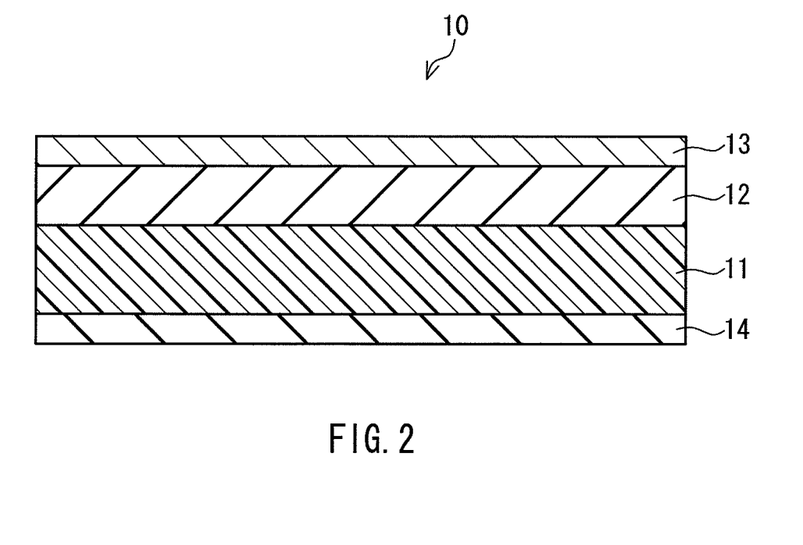
FIG. 2 is a schematic cross-sectional view of one example of the magnetic recording medium of the present invention.

Hereinafter, the magnetic recording medium of the present invention will be described with reference to the drawings. FIG. 2 is a schematic cross-sectional view of a magnetic tape as one example of the magnetic recording medium of the present invention.

A magnetic tape 10 shown in FIG. 2 includes a non-magnetic substrate 11, a non-magnetic layer 12 formed on one of the principal surfaces (here, on the upper surface) of the non-magnetic substrate 11 and a magnetic layer 13 formed on the principal surface (here, on the upper surface) of the non-magnetic layer 12 opposite to the non-magnetic substrate 11. Furthermore, a backcoat layer 14 is formed on the principal surface (here, on the lower surface) of the non-magnetic substrate 11 on which the non-magnetic layer 12 is not formed. Since the backcoat layer is not essential, it may not be provided.

Non-Magnetic Layer

The non-magnetic layer 12 is a layer that contains a non-magnetic powder, a binder and a lubricant.

Examples of the non-magnetic powder contained in the non-magnetic layer 12 include carbon black, titanium oxide, iron oxide and aluminum oxide. Generally, carbon black is used alone, or carbon black is mixed with another non-magnetic powder such as titanium oxide, iron oxide or aluminum oxide and the mixture is used. In order to form a coating having little unevenness in thickness to form the smooth non-magnetic layer 12, it is preferable to use a non-magnetic powder having a sharp particle size distribution. The average particle size of the non-magnetic powder is, for example, preferably 10 to 1000 nm, and more preferably 10 to 500 nm in terms of ensuring the uniformity, surface smoothness, and rigidity of the non-magnetic layer 12 as well as ensuring the conductivity.

The particle shape of the non-magnetic powder contained in the non-magnetic layer 12 may be a spherical, platelet, needle-like, or spindle-like shape. With regard to the average particle size of a needle-like or spindle-like non-magnetic powder, the average major axis diameter is preferably 10 to 300 nm, and the average minor axis diameter is preferably 5 to 200 nm. The average particle size of a spherical non-magnetic powder is preferably 5 to 200 nm, and more preferably 5 to 100 nm. The average particle size of a platelet non-magnetic powder is preferably 10 to 200 nm in terms of the largest plate diameter. Furthermore, in order to form the non-magnetic layer 12 that is smooth and has little unevenness in thickness, a non-magnetic powder having a sharp particle size distribution is preferably used. It should be noted that the "average particle size of a powder" as used herein means a number-average value of the particle size of 300 particles in a picture of the powder taken under a transmission electron microscope (TEM).

Conventionally-known thermoplastic resins, thermosetting resins, and the like can be used as the binder contained in the non-magnetic layer 12. Specific examples of the thermoplastic resins include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, and a polyester polyurethane resin. Specific examples of the thermosetting resins include a phenolic resin, an epoxy resin, a polyurethane resin, a urea resin, a melamine resin, and an alkyd resin. Among these binders, those having a functional group are preferable in order to enhance the dispersibility of the non-magnetic powder and to improve the filling properties. Specific examples of such a functional group include COOM, $SO_3M$, $OSO_3M$, $P=O(OM)_3$, $O-P=O(OM)_2$ (where M is a hydrogen atom, an alkali metal salt, or an amine salt), OH, NR1R2, NR3R4R5 (where R1, R2, R3, R4 and R5 are hydrogen or a hydrocarbon group, which usually has a carbon number of 1 to 10), and an epoxy group. When using two or more types of resins in combination, it is preferable to use resins whose functional groups have the same polarity, and, in particular, a combination of resins having an $SO_3M$ group is preferable. The content of these binders is preferably 7 to 50 parts by mass, and more preferably 10 to 35 parts by mass with respect to 100 parts by mass of the non-magnetic powder. In particular, it is preferable to use 5 to 30 parts by mass of a vinyl chloride resin and 2 to 20 parts by mass of a polyurethane resin in combination.

Further, radiation curable resins may be used as the binder instead of or in combination with a thermosetting resin such as described above. Examples of the radiation curable resins include a (meth)acrylic monomer and a (meth)acrylic oligomer. In particular, a radiation curable resin having two or more double bonds in each molecule and having a weight-average molecular weight of 50 to 300 per double bond is preferable. Specific examples of such radiation curable resins include: bifunctional (meth)acrylates such as 1,3-butanediol di(meth)acrylate, 1,4-butanediol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, ethoxylated bisphenol A di(meth)acrylate, novolac di(meth)acrylate, and propoxylated neopentyl glycol di(meth)acrylate; trifunctional (meth) acrylates such as tris(2-hydroxyethyl)isocyanurate tri(meth)

acrylate, trimethylolpropane tri(meth)acrylate, ethoxylated trimethylolpropane tri(meth)acrylate, pentaerythritol tri(meth)acrylate, propoxylated trimethylolpropane tri(meth)acrylate, propoxylated glyceryl tri(meth)acrylate, caprolactone modified trimethylolpropane tri(meth)acrylate; tetrafunctional or higher functional (meth)acrylates such as pentaerythritol tetra(meth)acrylate, ditrimethylolpropane tetra(meth)acrylate, ethoxylated pentaerythritol tetra(meth)acrylate, dipentaerythritol hydroxy penta(meth)acrylate, and dipentaerythritol hexa(meth)acrylate; and oligomers obtained by performing molecular chain extension of the above-described monomers with, for example, a polyether, polyester, polycarbonate, or polyurethane backbone. The content of the radiation curable resin in the non-magnetic layer 12 is preferably 5 to 30% by mass with respect to the combined amount of any other binder and the radiation curable resin.

Further, it is preferable to use, along with the above-described binder, a thermosetting crosslinking agent that binds to the functional group or the like contained in the binder and forms a crosslinking structure. Specific examples of the crosslinking agent include isocyanate compounds such as tolylene diisocyanate, hexamethylene diisocyanate, and isophorone diisocyanate; reaction products of an isocyanate compound and a compound, such as trimethylolpropane, having a plurality of hydroxyl groups; and various types of polyisocyanate such as a condensation product of an isocyanate compound. The content of the crosslinking agent is preferably 10 to 50 parts by mass with respect to 100 parts by mass of the binder.

Examples of the lubricant contained in the non-magnetic layer 12 include a conventionally-known fatty acid having a carbon number of 10 to 30. Although the fatty acid may be any of a straight-chain fatty acid, a branched-chain fatty acid, and a cis-trans isomer, a straight-chain fatty acid, which has excellent lubricating ability, is preferable. Specific examples of such a fatty acid include lauric acid, myristic acid, stearic acid, palmitic acid, behenic acid, oleic acid, and linoleic acid. These fatty acids may be used alone or in combination of two or more. The content of the fatty acid in the non-magnetic layer 12 is preferably 0.2 to 5 parts by mass with respect to 100 parts by mass of the non-magnetic powder. A fatty acid content of 0.2 parts by mass or more can cause the fatty acid to sufficiently seep from the non-magnetic layer 12 into the magnetic layer 13, and therefore can improve the transport durability of the magnetic tape in a low-humidity environment even more. A fatty acid content of 5 parts by mass or less can ensure the toughness of the non-magnetic layer 12.

Furthermore, the non-magnetic layer 12 may contain, along with the above-described fatty acid, a conventionally-known fatty acid ester or fatty acid amide as the lubricant. Specific examples of the fatty acid ester include n-butyl oleate, hexyl oleate, n-octyl oleate, 2-ethylhexyl oleate, coleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the fatty acid amide include palmitic acid amide and stearic acid amide. These fatty acid esters and fatty acid amides may be used alone or in combination of two or more. The combined content of the fatty acid ester and the fatty acid amide in the non-magnetic layer 12 is preferably 0.2 to 10 parts by mass with respect to 100 parts by mass of the non-magnetic powder. A fatty acid ester and fatty acid amide content of 0.2 parts by mass or more can cause the lubricant to sufficiently seep from the non-magnetic layer 12 into the magnetic layer 13, which in turn can reduce the coefficient of friction even more. A lubricant content of 10 parts by mass or less can ensure the toughness of the non-magnetic layer 12. In particular, it is preferable that 0.5 to 4 parts by mass of fatty acid and 0.2 to 3 parts by mass of fatty acid ester are contained with respect to 100 parts by mass of the non-magnetic powder. A fatty acid content of less than 0.5 parts by mass will result in a decreased effect of reducing the coefficient of friction, and a fatty acid content of more than 4 parts by mass will cause plasticization of the non-magnetic layer 12, which may lead to a loss of toughness. Further, a fatty acid ester content of less than 0.2 parts by mass will result in a decreased effect of reducing the coefficient of friction, and a fatty acid ester content of more than 3 parts by mass will cause an excessive amount of lubricant to be introduced into the magnetic layer 13, and therefore, an adverse effect including, for example, sticking of the magnetic tape to the magnetic head may occur.

The non-magnetic layer 12 may further contain conventionally-known additives such as a dispersing agent and a polishing agent, as long as it contains the non-magnetic powder, the binder and the lubricant, which are described above.

Specific examples of the dispersant include: fatty acids having a carbon number of 12 to 18 (RCOOH (where R is an alkyl group or alkenyl group having a carbon number of 11 to 17)) such as caprylic acid, capric acid, lauric acid, myristic acid, palmitic acid, stearic acid, behenic acid, oleic acid, elaidic acid, linoleic acid, linolenic acid and stearolic acid; metal soaps made of alkali metals or alkali earth metals of the above-described fatty acids; compounds containing fluorine of the above-described fatty acid esters; amides of the above-described fatty acids; polyalkylene oxide alkylphosphate; lecithin; trialkyl polyolefin oxy-quaternary ammonium salt (where alkyl has a carbon number of 1 to 5 and olefin is ethylene, propylene or the like); phenylphosphonic acid; and copper phthalocyanine. These may be used alone or in combination. The content of the dispersant is preferably 0.2 to 5 parts by mass with respect to 100 parts by mass of the non-magnetic powder.

With regard to the polishing agent, it is possible to use a polishing agent similar to the polishing agent for use in the magnetic layer 13 described later.

The non-magnetic layer 12 has a thickness of preferably 0.1 to 3 µm, and more preferably 0.1 to 1.2 µm. When the non-magnetic layer 12 has a thickness of 0.1 µm or more, it is possible to contain the lubricant in the non-magnetic layer 12 in amount sufficient for ensuring the transport durability. On the other hand, when the non-magnetic layer 12 has a thickness of 3 µm or less, it is possible to avoid the magnetic tape from having a large overall thickness unnecessarily, which in turn allows an increase in the recording capacity per volume.

Methods of forming the non-magnetic layer 12 are not particularly limited. The non-magnetic layer 12 may be formed by dispersing the components for forming the non-magnetic layer such as the non-magnetic powder, the binder and the lubricant described above in a solvent to prepare a non-magnetic paint, applying the non-magnetic paint on the principal surface of the non-magnetic substrate 11 (described later) and drying the applied paint. For example, tetrahydrofuran, cyclohexanone, methylethylketone, toluene or the like can be used as the solvent.

Magnetic Layer

The magnetic layer 13 is a layer that contains a magnetic powder and a binder.

Specific examples of the magnetic powder contained in the magnetic layer 13 include hexagonal ferrite magnetic powder, ferromagnetic metallic iron magnetic powder, and iron nitride magnetic powder. The average particle size of the magnetic powder is preferably 10 to 35 nm, and more preferably 15 to 25 nm. An average particle size of 10 nm or more will allow for preparation of a magnetic paint having excellent dispersibility. On the other hand, an average particle size of 35 nm or less can reduce particle noise. It should be noted that, the "average particle size" of a magnetic powder refers to an average major axis diameter in the case of a needle-like magnetic powder, the largest plate diameter in the case of a platelet magnetic powder, or the largest diameter in the case of a spherical or ellipsoidal magnetic powder having a ratio of the major axis length to the minor axis length within a range of 1 to 3.5.

It is possible to use conventionally-known binders as the binder contained in the magnetic layer 13. Among these, a binder similar to the binder for use in the non-magnetic layer 12 is preferable in light of the dispersibility of the magnetic powder and the rigidity of the magnetic layer 13. The content of the binder in the magnetic layer 13 is preferably 7 to 50 parts by mass, and more preferably 10 to 35 parts by mass with respect to 100 parts by mass of the magnetic powder. In particular, when using a vinyl chloride resin and a polyurethane resin in combination, it is preferable to use 5 to 30 parts by mass of vinyl chloride resin and 2 to 20 parts by mass of polyurethane resin. Further, as in the case of the non-magnetic layer 12, in order to crosslink the binder to enhance the strength of the magnetic layer 13, it is preferable to use a crosslinking agent such as polyisocyanate. The content of the crosslinking agent is preferably 10 to 50 parts by mass with respect to 100 parts by mass of the binder.

The magnetic layer 13 may further contain known additives such as a polishing agent, a lubricant and a dispersing agent, as long as it contains the magnetic powder and the binder, which are described above. In particular, a polishing agent and a lubricant are preferably used in light of the transport durability.

Specific examples of the polishing agent include α-alumina, β-alumina, silicon carbide, chromium oxide, ceric oxide, α-iron oxide, corundum, synthetic diamond, silicon nitride, silicon carbide, titanium carbide, titanium oxide, silicon dioxide, and boron nitride, and among these, a polishing agent having a Mohs' hardness of 6 or more is more preferable. These polishing agents may be used alone or in combination of two or more. The average particle size of the polishing agent is preferably 10 to 200 nm although it depends on the type of polishing agent used. The content of the polishing agent is preferably 5 to 20 parts by mass, and more preferably 8 to 18 parts by mass with respect to 100 parts by mass of the magnetic powder.

With regard to the lubricant, it is possible to use a lubricant similar to the lubricant for use in the non-magnetic layer 12. Among these, it is preferable to use a fatty acid ester and a fatty acid amide in combination. When containing a lubricant in the magnetic layer 13, it is preferable to use 0.2 to 3 parts by mass of fatty acid ester and 0.5 to 5 parts by mass of fatty acid amide with respect to the total amount, which is taken as 100 parts by mass, of all the powders, such as the magnetic powder and the polishing agent, in the magnetic layer 13. The reason for this is as follows. A fatty acid ester content of less than 0.2 parts by mass will result in a decreased effect of reducing the coefficient of friction, and a fatty acid ester content of more than 3.0 parts by mass will lead to a risk of an adverse effect such as sticking of the magnetic layer 13 to the head. A fatty acid amide content of less than 0.5 parts by mass will result in a decreased effect of preventing seizing, which occurs due to mutual contact between the magnetic head and the magnetic layer 13, and a fatty acid amide content of more than 5 parts by mass will lead to a risk of bleeding of the fatty acid amide. When containing fatty acid in the magnetic layer 13 as the lubricant, it is preferable to use 0.5 to 4 parts by mass of fatty acid with respect to the total amount, which is taken as 100 parts by mass, of all the powders, such as the magnetic powder and the polishing agent, in the magnetic layer 13. It should be noted that the lubricant contained in the magnetic layer 13 and the lubricant contained in the non-magnetic layer 12 are mutually migratable.

With regard to the dispersing agent, it is possible to use the same dispersing agent as that for use in the non-magnetic layer 12. The content of the dispersing agent is generally in a range of 0.5 to 10 parts by mass with respect to 100 parts by mass of the magnetic powder.

Further, the magnetic layer 13 may contain a conventionally-known carbon black for the purpose of improving the conductivity and the surface lubricity, if necessary. Specific examples of such a carbon black include acetylene black, furnace black, and thermal black. The carbon black preferably has an average particle size of 0.01 to 0.1 μm. An average particle size of 0.01 μm or more will allow for formation of the magnetic layer 13 in which the carbon black is well dispersed. On the other hand, an average particle size of 0.1 μm or less will allow for formation of the magnetic layer 13 that has excellent surface smoothness. Moreover, two or more types of carbon blacks having different average particle sizes may be used, if necessary. The content of the carbon black is preferably 0.2 to 5 parts by mass, and more preferably 0.5 to 4 parts by mass with respect to 100 parts by mass of the magnetic powder.

For the purpose of improving the short-wavelength recording characteristics, the magnetic layer 13 preferably has a thickness of 10 to 150 nm, more preferably 20 to 100 nm, and even more preferably 30 to 70 nm. As long as the magnetic layer 13 has the aforementioned thickness, thickness loss during recording/reproduction due to the self-demagnetization effect can be reduced even in the case of short-wavelength recording. Thus, it is possible to achieve a high output even in a system whose shortest recording wavelength is 0.3 μm or less. The magnetic layer 13 having such a small thickness in particular cannot contain a large amount of the lubricant. For this reason, the magnetic recording medium (magnetic tape) of the present invention is suitable for improving the transport characteristics.

Mr·t, which is a product of Mr as the residual magnetic flux density of the magnetic layer 13 in the longitudinal direction and t as the average thickness of the magnetic layer 13, is 0.0020 to 0.0150 μT·m, more preferably 0.0040 to 0.0125 μT·m, and even more preferably 0.0040 to 0.0100 μT·m. The recording density improves as Mr·t becomes smaller. However, in the case where an MR head is used as a reproduction head, a reproduced output tends to decline when Mr·t is too small. On the other hand, in the case where Mr·t is too large, the MR head is saturated, whereby a reproduced output tends to be distorted.

The "surface roughness" of the magnetic layer 13 refers to Ra as centerline average roughness defined in the Japanese Industrial Standard (JIS) B0601, and it is preferable that Ra as the centerline average roughness is less than 2.0 nm. The more the surface smoothness of the magnetic layer 13 improves, the higher the output that can be obtained, but an excessively smoothed surface of the magnetic layer 13 will lead to an increase in the coefficient of friction, which in turn decreases the transport stability. Therefore, Ra is preferably 1.0 nm or more.

Methods of forming the magnetic layer 13 are not particularly limited. The magnetic layer 13 may be formed by dispersing the components for forming the magnetic layer such as the magnetic powder and the lubricant as described above in a solvent to prepare a magnetic paint, applying the magnetic paint on the principal surface of the non-magnetic layer 12 described above, and drying the applied paint. For example, tetrahydrofuran, cyclohexanone, methylethylketone, toluene or the like can be used as the solvent.

Non-Magnetic Substrate

A conventionally used non-magnetic substrate for magnetic recording media can be used as the non-magnetic substrate 11. Specific examples of the non-magnetic substrate include plastic films composed of polyesters such as polyethylene terephthalate and polyethylene naphthalate, polyolefins, cellulose triacetate, polycarbonate, polyamide, polyimide, polyamide imide, polysulfone, and aramid.

The thickness of the non-magnetic substrate 11, which varies depending on the application, is preferably 1.5 to 11 µm, and more preferably 2 to 7 µm. When the non-magnetic substrate 11 has a thickness of 1.5 µm or more, the film forming properties are improved, and a high strength can be achieved. On the other hand, when the non-magnetic substrate 11 has a thickness of 11 µm or less, an unnecessary increase in the overall thickness will be avoided, and, for example, in the case of a magnetic tape, the recording capacity per reel can be increased.

The Young's modulus of the non-magnetic substrate 11 in the longitudinal direction is preferably 5.8 GPa or more, and more preferably 7.1 GPa or more. When the Young's modulus of the non-magnetic substrate 11 in the longitudinal direction is 5.8 GPa or more, the transport characteristics can be improved. Moreover, in the case of a magnetic recording medium for use in a helical scanning system, the ratio (MD/TD) of the Young's modulus (MD) in the longitudinal direction to the Young's modulus (TD) in the width direction is preferably within a range of 0.6 to 0.8, more preferably within a range of 0.65 to 0.75, and even more preferably 0.7. As long as this ratio falls within the above-described range, variations in the output of the magnetic head between an entrance side and an exit side of a track (flatness) can be suppressed. In the case of a magnetic recording medium for use in a linear recording system, the ratio (MD/TD) of the Young's modulus (MD) in the longitudinal direction to the Young's modulus (TD) in the width direction is preferably within a range of 0.7 to 1.3.

The temperature coefficient of expansion of the non-magnetic substrate 11 in the width direction is preferably 0 to $10\times10^{-6}$, and the humidity coefficient of expansion in the width direction is preferably 0 to $10\times10^{-6}$. As long as these coefficients fall within the above-described ranges, off-track errors due to a change in the temperature or humidity can be suppressed, so that the error rate can be reduced.

Backcoat Layer

For the purpose of improving the transport characteristics and the like, it is preferable that the backcoat layer 14 is provided on the principal surface (here, on the lower surface) of the non-magnetic substrate 11 opposite to the one on which the non-magnetic layer 12 is formed. The backcoat layer 14 preferably has a thickness of 0.2 to 0.8 µm, and more preferably 0.3 to 0.8 µm. The reason for this is as follows. An excessively small thickness of the backcoat layer 14 will result in an insufficient effect of improving the transport characteristics, and an excessively large thickness will lead to an increase in the overall thickness of the magnetic tape, which in turn result in a decrease in the recording capacity per reel of magnetic tape.

The backcoat layer 14 preferably contains a carbon black including, for example, acetylene black, furnace black, or thermal black. Generally, a small particle size carbon black and a large particle size carbon black, which are relatively different in particle size, are used in combination. This is because the combined use will increase the effect of improving the transport characteristics.

Moreover, the backcoat layer 14 contains a binder. Binders are not particularly limited and binders similar to those for use in the non-magnetic layer 12 and the magnetic layer 13 can be used. Among these, it is preferable to use a cellulose resin and a polyurethane resin in combination in order to reduce the coefficient of friction and improve the transport characteristics with respect to the magnetic head.

For the purpose of improving the strength, it is preferable that the backcoat layer 14 further contains iron oxide, alumina, or the like. Methods for forming the backcoat layer are not particularly limited. The backcoat layer may be formed by dispersing the components for forming the backcoat layer in a solvent to prepare a backcoat layer paint, applying the backcoat layer paint on the principal surface of the non-magnetic substrate 11 opposite to the one on which the non-magnetic layer 12 is formed, and drying the applied paint. The backcoat layer 14 may be formed before or after the formation of the non-magnetic layer 12 and the magnetic layer 13.

Topcoat Layer

Although not being illustrated, a topcoat layer may also be formed by applying the above-described lubricant further onto the surface of the magnetic layer 13 shown in FIG. 2. This further improves the transport characteristics and durability of the magnetic tape.

Hereinafter, the present invention will be described more specifically by means of examples. However, the present invention is not limited to the examples below. It should be noted that in the following description, "part" means "part by mass".

Example 1

Preparation of Non-Magnetic Paint

A kneaded product was prepared by kneading non-magnetic paint components (1) listed in Table 1 using a batch-type kneader. The obtained kneaded product and non-magnetic paint components (2) listed in Table 2 were stirred with a stirrer to prepare a mixed solution. The obtained mixed solution was dispersed using a sand mill (residence time: 60 minutes) filled with zirconia beads (specific gravity: 6, particle size: 0.1 mm) to prepare a dispersion, and afterward, the obtained dispersion and non-magnetic paint components (3) listed in Table 3 were stirred with the stirrer, and the resulting solution was filtered through a filter to prepare a non-magnetic paint. Then, the non-magnetic paint was passed through a collision chamber twice with an orifice diameter of 0.2 mm and a pressuring condition of 150 MPa using a collision type disperser to redisperse the non-magnetic paint, thus obtaining the non-magnetic paint.

TABLE 1

| Non-magnetic paint components (1) | Part |
|---|---|
| Needle-like iron oxide (average particle size: 110 nm) | 68 |
| Carbon black (average particle size: 17 nm) | 20 |
| Granular alumina powder (average particle size: 120 nm) | 12 |
| Methyl acid phosphate | 1 |
| Vinyl chloride-hydroxypropyl acrylate copolymer (—SO$_3$Na group content: $0.7 \times 10^{-4}$ equivalent/g) | 9 |
| Polyester polyurethane resin (glass-transition temperature: 40° C., —SO$_3$Na group content: $1 \times 10^{-4}$ equivalent/g) | 5 |
| Tetrahydrofuran | 13 |

TABLE 1-continued

| Non-magnetic paint components (1) | Part |
|---|---|
| Cyclohexanone | 63 |
| Methyl ethyl ketone | 137 |

TABLE 2

| Non-magnetic paint components (2) | Part |
|---|---|
| Stearic acid | 1 |
| Butyl stearate | 1.5 |
| Cyclohexanone | 50 |
| Methyl ethyl ketone | 50 |

TABLE 3

| Non-magnetic paint components (3) | Part |
|---|---|
| Polyisocyanate | 2.5 |
| Cyclohexanone | 9 |
| Toluene | 9 |

Preparation of Magnetic Paint

A kneaded product was prepared by kneading magnetic paint components (1) listed in Table 4 and magnetic paint components (2) listed in Table 5 using the batch-type kneader. To the obtained kneaded product, magnetic paint components (3) listed in Table 6 were added in two steps to dilute the kneaded product, thus a slurry was prepared. The slurry was dispersed using the sand mill (residence time: 45 minutes) filled with zirconia beads (specific gravity: 6, particle size: 0.1 mm) to prepare a dispersion, and then the obtained dispersion and magnetic paint components (4) listed in Table 7 were stirred with the stirrer, and the resulting solution was filtered through a filter to prepare a magnetic paint.

TABLE 4

| Magnetic paint components (1) | Part |
|---|---|
| Ferromagnetic metallic iron magnetic powder (Fe) (additional elements: Co, Al, and Y) [Co/Fe: 24 at %, Al/(Fe + Co): 9.2 at %, Y/(Fe + Co): 11.8 at %, σs: 95 A · m²/kg, Hc: 188 kA/m, average particle size: 35 nm, axial ratio: 3.8] | 100 |
| Polyester polyurethane resin (—SO$_3$Na group content: 1 × 10$^{-4}$ equivalent/g) | 2 |
| Granular alumina powder (average particle size: 80 nm) | 10 |
| Phenylphosphonic acid | 4 |
| Tetrahydrofuran | 271 |

TABLE 5

| Magnetic paint components (2) | Part |
|---|---|
| Vinyl chloride-hydroxypropyl acrylate copolymer (—SO$_3$Na group content: 0.7 × 10$^{-4}$ equivalent/g) | 17 |
| Polyester polyurethane resin (glass-transition temperature: 40° C., —SO$_3$Na group content: 1 × 10$^{-4}$ equivalent/g) | 4 |
| Methyl ethyl ketone | 5 |
| Cyclohexanone | 7 |
| Toluene | 5 |

TABLE 6

| Magnetic paint components (3) | Part |
|---|---|
| Palmitic acid amide | 4 |
| Cyclohexanone | 175 |
| Methyl ethyl ketone | 175 |

TABLE 7

| Magnetic paint components (4) | Part |
|---|---|
| Polyisocyanate | 1.5 |
| Cyclohexanone | 14.5 |
| Methyl ethyl ketone | 14.5 |

Preparation of Backcoat Layer Paint

A mixed solution in which backcoat layer paint components listed in Table 8 were mixed was dispersed using the sand mill (residence time: 45 minutes) filled with zirconia beads (specific gravity: 6, particle size: 0.1 mm). Then, 15 parts of polyisocyanate was added to the obtained dispersion and stirred, and the resulting solution was filtered through a filter to prepare a backcoat layer paint.

TABLE 8

| Backcoat layer paint components | Part |
|---|---|
| Carbon black (average particle size: 25 nm) | 87 |
| Carbon black (average particle size: 300 nm) | 10 |
| Granular alumina powder (average particle size: 80 nm) | 3 |
| Nitrocellulose | 45 |
| Polyurethane resin (containing —SO$_3$Na group) | 30 |
| Cyclohexanone | 260 |
| Toluene | 260 |
| Methyl ethyl ketone | 525 |

Production of Magnetic Tape for Evaluation

The above-described non-magnetic paint and magnetic paint were applied to one principal surface (the upper surface) of a non-magnetic substrate (a polyethylene naphthalate film, thickness: 5.0 μm) with an extrusion coater by simultaneous multilayer coating in such a manner that the non-magnetic paint and the magnetic paint after being dried and subjected to calendering would have a thickness of 1.0 μm and 50 nm, respectively, and thus a non-magnetic layer and a magnetic layer were formed in this order. It should be noted that at this time, a process for providing in-plane orientation was performed while applying an orientation magnetic field (400 kA/m) using a solenoid magnet.

Next, the above-described backcoat layer paint was applied to the principal surface (the lower surface) of the non-magnetic substrate opposite to the principal surface (the upper surface) on which the non-magnetic layer and the magnetic layer were formed, in such a manner that the backcoat layer paint would have a thickness of 0.5 μm after being dried and subjected to calendering, and then the paint was dried to form a backcoat layer. The resulting raw fabric roll with the non-magnetic layer and the magnetic layer formed on the upper surface side of the non-magnetic substrate and the backcoat layer on the lower surface side was subjected to calendering using a calender having seven stages of metal rollers at a temperature of 100° C. and a line pressure of 296 kN/m.

The resulting raw fabric roll was cured at 70° C. for 72 hours to produce a magnetic sheet. This magnetic sheet was cut into pieces of a width of ½ inches, and a servo signal conforming to the LTO standards was written. Then, the magnetic layer was subjected to polishing using a rotating polishing wheel (material: stainless steel (SUS304), diameter: 30 mm, 36 grooves (width, depth: 0.5 mm) being formed at a 45° angle relative to the circumferential direction), thus a magnetic tape for evaluation was produced.

Example 2

A magnetic tape for evaluation was produced in the same manner as in Example 1 except that the thickness of the magnetic layer after being dried and subjected to calendering was changed to 60 nm, the collision type disperser was not used during the preparation of the non-magnetic paint, the calendering conditions were changed to a temperature of 100° C. and a line pressure of 196 kN/m, and the magnetic layer was not subjected to polishing.

Example 3

A magnetic tape for evaluation was produced in the same manner as in Example 1 except that the calendaring conditions were changed to a temperature of 100° C. and a line pressure of 196 kN/m, and the magnetic layer was not subjected to polishing.

Example 4

A magnetic tape for evaluation was produced in the same manner as in Example 1 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering at a temperature of 100° C. and a line pressure of 194 kN/m. Subsequently, the magnetic layer was formed on the non-magnetic layer in such a manner that the magnetic layer would have a thickness of 35 nm after being dried and subjected to calendering. After being dried, the magnetic layer was subjected to calendering at a temperature of 100° C. and a line pressure of 196 kN/m. In this Example, the collision type disperser was not used during the preparation of the non-magnetic paint and the magnetic layer was not subjected to polishing.

Example 5

Preparation of Topcoat Layer Paint

Topcoat layer paint components listed in Table 9 were mixed using the stirrer to prepare a topcoat layer paint.

A magnetic tape for evaluation was produced in the same manner as in Example 1 except for the following. The magnetic powder of the magnetic paint components (1) was changed to a barium ferrite (Ba—Fe) magnetic powder (σs: 50 A·m²/kg, Hc: 159 kA/m, average particle size (plate diameter): 20 nm), the thickness of the magnetic layer after being dried and subjected to calendering was changed to 60 nm, the collision type disperser was not used during the preparation of the non-magnetic paint, the application of the orientation magnetic field using the solenoid magnet was not performed, the calendering conditions were changed to a temperature of 100° C. and a line pressure of 196 kN/m, the topcoat layer paint was applied to the magnetic layer after performing calendering, and the magnetic layer was not subjected to polishing.

TABLE 9

| Topcoat layer paint components | Part |
|---|---|
| Stearic acid | 1 |
| Butyl stearate | 1 |
| Isopropyl alcohol | 100 |

Example 6

A magnetic tape for evaluation was produced in the same manner as in Example 5 except that the non-magnetic paint was passed through the collision chamber twice with an orifice diameter of 0.2 mm and a pressurizing condition of 150 MPa using the collision type disperser to redisperse the non-magnetic paint, and the topcoat layer was not formed on the magnetic layer.

Example 7

A magnetic tape for evaluation was produced in the same manner as in Example 5 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering at a temperature of 100° C. and a line pressure of 294 kN/m. Subsequently, the magnetic layer was formed on the non-magnetic layer in such a manner that the magnetic layer would have a thickness of 30 nm after being dried and subjected to calendering. After being dried, the magnetic layer was subjected to calendering at a temperature of 100° C. and a line pressure of 294 kN/m. In this Example, the topcoat layer was not formed on the magnetic layer.

Example 8

A magnetic tape for evaluation was produced in the same manner as in Example 5 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering twice at a temperature of 100° C. and a line pressure of 294 kN/m. Subsequently, the magnetic layer was formed on the non-magnetic layer in such a manner that the magnetic layer would have a thickness of 100 nm after being dried and subjected to calendering. After being dried, the magnetic layer was subjected to calendering at a temperature of 100° C. and a line pressure of 196 kN/m. In this Example, the topcoat layer was not formed on the magnetic layer.

Comparative Example 1

A magnetic tape for evaluation was produced in the same manner as in Example 1 except that the collision type disperser was not used during the preparation of the non-magnetic paint, the calendering conditions were changed to a temperature of 100° C. and a line pressure of 196 kN/m, and the magnetic layer was not subjected to polishing.

Comparative Example 2

A magnetic tape for evaluation was produced in the same manner as in Example 1 except that the calendering conditions were changed to a temperature of 100° C. and a line pressure of 196 kN/m, the magnetic layer was not subjected to polishing, and the content of the stearic acid (as listed in Table 9 as a topcoat layer component) in the topcoat layer paint was changed to 2 parts, and this topcoat layer paint was applied onto the magnetic layer.

Comparative Example 3

A magnetic tape for evaluation was produced in the same manner as in Example 1 except that after being subjected to polishing using the polishing wheel the magnetic layer was further cleaned with a lapping tape (#20000, manufactured by Nihon Micro Coating Co., Ltd.), and then dirt on the surface of the magnetic layer was removed with a cleaning tissue.

Comparative Example 4

A magnetic tape for evaluation was produced in the same manner as in Example 1 except that the thickness of the magnetic layer after being dried and subjected to calendering was changed to 75 nm, the collision type disperser was not used during the preparation of the non-magnetic paint, the calendering conditions were changed to a temperature of 100° C. and a line pressure of 196 kN/m, and the magnetic layer was not subjected to polishing.

Comparative Example 5

A magnetic tape for evaluation was produced in the same manner as in Example 5 except for the following. After forming the non-magnetic layer with the extrusion coater in such a manner that the non-magnetic layer would have a thickness of 1.0 µm after being dried and subjected to calendering, the non-magnetic layer was dried, and then was subjected to calendering twice at a temperature of 100° C. and a line pressure of 294 kN/m. Subsequently, the magnetic layer was formed on the non-magnetic layer in such a manner that the magnetic layer would have a thickness of 25 nm after being dried and subjected to calendering. After being dried, the magnetic layer was subjected to calendering at a temperature of 100° C. and a line pressure of 196 kN/m. In this Comparative Example, the topcoat layer was not formed on the magnetic layer.

The S/N ratio of each of the magnetic tapes for evaluation produced in Examples 1 to 8 and Comparative Examples 1 to 5 was measured in the following manner to evaluate the transport durability of each magnetic tape. Further, for each of the magnetic tapes, t as the average thickness of the magnetic layer, L1 as the average thickness of the first mixed layer and L2 as the average thickness of the second mixed layer were measured by the layer thickness measuring method of the present invention described above. Further, Mr·t of the magnetic layer was measured.

Measurement of S/N Ratio

A signal with a recording wavelength of 220 nm was recorded onto each magnetic tape at a tape speed of 1.5 msec using an apparatus for measuring magnetic recording properties of linear tapes equipped with an MR head (write track width: 11 µm, write gap length: 0.35 µm, read track width: 6 µm, read shield to shield gap length: 160 nm). Note that the apparatus was obtained by modifying an LTO drive. After amplifying the reproduced signal with a commercially available Read amplifier for MR heads, a fundamental wave component output (S) and integrated noise (N) of the signal were measured using a spectrum analyzer N9020A manufactured by Agilent Technologies, Inc to calculate the S/N ratio. The results are provided in Tables 10 and 11. In Tables 10 and 11, the S/N ratio of Comparative Example 1 is taken as a reference (0 dB), and each S/N ratio is provided as a relative value (dB).

Evaluation of Transport Durability

After transporting each magnetic tape in its entire length 10000 passes (5000 round trips) using the apparatus for measuring magnetic recording properties of linear tapes, an output from each tape was measured. The transport durability was evaluated based on the extent of decline in output (dB) from the initial output prior to performing the 10000 passes of transport in an environment at 45° C. and 10% RH. The results are provided in Tables 10 and 11.

Measurement of t, L1 and L2

By the layer thickness measuring method of the present invention described above, t as the average thickness of the magnetic layer, L1 as the average thickness of the first mixed layer and L2 as the average thickness of the second mixed layer were measured. The results are provided in Tables 10 and 11.

Measurement of Mr·t

The value of residual magnetization measured using a sample vibration type magnetometer at 25° C. and an applied magnetic field of 796.3 kA/m was divided by the plane area of the measured sample to determine Mr·t.

TABLE 10

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Magnetic powder | Fe | Fe | Fe | Fe | Ba—Fe | Ba—Fe | Ba—Fe | Ba—Fe |
| Mr·t (µT·m) | 0.0125 | 0.0150 | 0.0125 | 0.0088 | 0.0050 | 0.0050 | 0.0020 | 0.0084 |
| t (nm) | 50 | 60 | 50 | 35 | 60 | 60 | 30 | 100 |
| L1 (nm) | 2 | 4 | 4 | 3 | 6 | 4 | 3 | 4 |
| L2 (nm) | 20 | 25 | 20 | 15 | 25 | 20 | 12 | 10 |
| L2/t | 0.40 | 0.42 | 0.40 | 0.43 | 0.42 | 0.33 | 0.40 | 0.10 |
| S/N ratio (db) | 1.5 | 0.6 | 0.9 | 1.4 | 0.5 | 1.5 | 0.8 | 0.7 |
| Decline in output (db) | −1.7 | −0.8 | −1.2 | −1.5 | −0.2 | −1.3 | −1.6 | −0.5 |

TABLE 11

|  | Comp. Ex. 1 | Comp. Ex. 2 | Comp. Ex. 3 | Comp. Ex. 4 | Comp. Ex. 5 |
| --- | --- | --- | --- | --- | --- |
| Magnetic powder | Fe | Fe | Fe | Fe | Ba—Fe |
| Mr·t (µT·m) | 0.0125 | 0.0125 | 0.0125 | 0.0188 | 0.0019 |
| t (nm) | 50 | 50 | 50 | 75 | 25 |
| L1 (nm) | 4 | 7 | 1 | 4 | 3 |
| L2 (nm) | 25 | 20 | 20 | 25 | 10 |
| L2/t | 0.50 | 0.40 | 0.40 | 0.33 | 0.40 |

TABLE 11-continued

|  | Comp. Ex. 1 | Comp. Ex. 2 | Comp. Ex. 3 | Comp. Ex. 4 | Comp. Ex. 5 |
|---|---|---|---|---|---|
| S/N ratio (db) | 0 | −0.2 | 1.9 | −0.1 | 0.7 |
| Decline in output (db) | −1 | −0.1 | −2.8 | −0.3 | −2.3 |

As can be seen from Tables 10 and 11, the magnetic tapes of the present invention produced in Examples 1 to 8 each had an excellent S/N ratio, a small decline in output after being transported. These results indicate that they can be used at a practical level without any problems. In contrast, Comparative Example 1 in which L2/t was more than 0.45 had a small S/N ratio, Comparative Example 2 in which L1 was more than 6 nm had a small S/N ratio, Comparative Example 3 in which L1 was less than 2 nm had a large decline in output, Comparative Example 4 in which Mr·t was more than 0.0150 μT·m had a small S/N ratio, and Comparative Example 5 in which Mr·t was less than 0.0020 μT·m had a large decline in output.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic recording medium comprising: a non-magnetic substrate; a non-magnetic layer formed on one of principal surfaces of the non-magnetic substrate; and a magnetic layer formed on a principal surface of the non-magnetic layer opposite to the non-magnetic substrate, wherein Mr and t satisfy $0.0020\ \mu T\cdot m \leq Mr\cdot t \leq 0.0150\ \mu T\cdot m$, where Mr is the residual magnetic flux density of the magnetic layer, and t is the average thickness of the magnetic layer, L1 satisfies $2\ nm \leq L1 \leq 6\ nm$, where L1 is the average thickness of a first mixed layer that is formed on the surface of the magnetic layer opposite to the non-magnetic layer, L2 satisfies $0.1 \leq L2/t \leq 0.45$, where L2 is the average thickness of a second mixed layer that is formed on the surface of the magnetic layer facing the non-magnetic layer, the first mixed layer comprises components of the magnetic layer and non-magnetic components including at least one selected from the group consisting of a lubricant, a resin, and a filler, a content of the components of the magnetic layer per unit volume of the first mixed layer is lower than a content of components of the magnetic layer per unit volume of the magnetic layer, and the second mixed layer comprises components of the magnetic layer and components of the non-magnetic layer.

2. The magnetic recording medium according to claim 1, wherein L1 as the average thickness of the first mixed layer satisfies $2\ nm \leq L1 \leq 4\ nm$, and L2 as the average thickness of the second mixed layer satisfies $0.1 \leq L2/t \leq 0.40$.

3. The magnetic recording medium according to claim 1, wherein the magnetic layer contains a magnetic powder and a binder, and the magnetic powder is one selected from the group consisting of a hexagonal ferrite magnetic powder, a ferromagnetic metallic iron magnetic powder and an iron nitride magnetic powder.

4. The magnetic recording medium according to claim 3, wherein the magnetic powder has an average particle size of 10 to 35 nm.

5. The magnetic recording medium according to claim 1, wherein the magnetic layer has a thickness of 10 to 150 nm.

6. The magnetic recording medium according to claim 1, wherein the magnetic layer has Ra of 1.0 nm or more and less than 2.0 nm, where Ra is centerline average roughness defined in JIS B0601.

7. The magnetic recording medium according to claim 1, wherein the non-magnetic layer has a thickness of 0.1 to 3 μm.

8. The magnetic recording medium according to claim 1, wherein a backcoat layer is further formed on the principal surface of the non-magnetic substrate opposite to the principle surface on which the non-magnetic layer is formed.

9. The magnetic recording medium according to claim 1, wherein the average thickness t of the magnetic layer represents a distance between a first peak and a second peak of a differential curve obtained from a luminance curve, wherein the luminance curve is created by observing a cross section of the magnetic recording medium using a YAG detector to obtain a backscattered electron image of the cross section, determining luminance values of the cross section from the backscattered electron image, and averaging the luminance values of the cross section, and when an average luminance value of the non-magnetic layer is taken as 0 and the highest luminance value of the magnetic layer is taken as 100 in the luminance curve, the average thickness L1 of the first mixed layer represents an average thickness of an area of the magnetic layer, wherein the area is on the opposite side to the non-magnetic layer and luminance values of the area range from 70 to 30, and the average thickness L2 of the second mixed layer represents an average thickness of an area of the magnetic layer, wherein the area is on the non-magnetic layer side and luminance values of the area range from 70 to 30.

* * * * *